Sept. 10, 1940.                A. W. SCOTT                2,214,679
                             BRAKE MECHANISM
                       Filed April 18, 1939          2 Sheets-Sheet 1
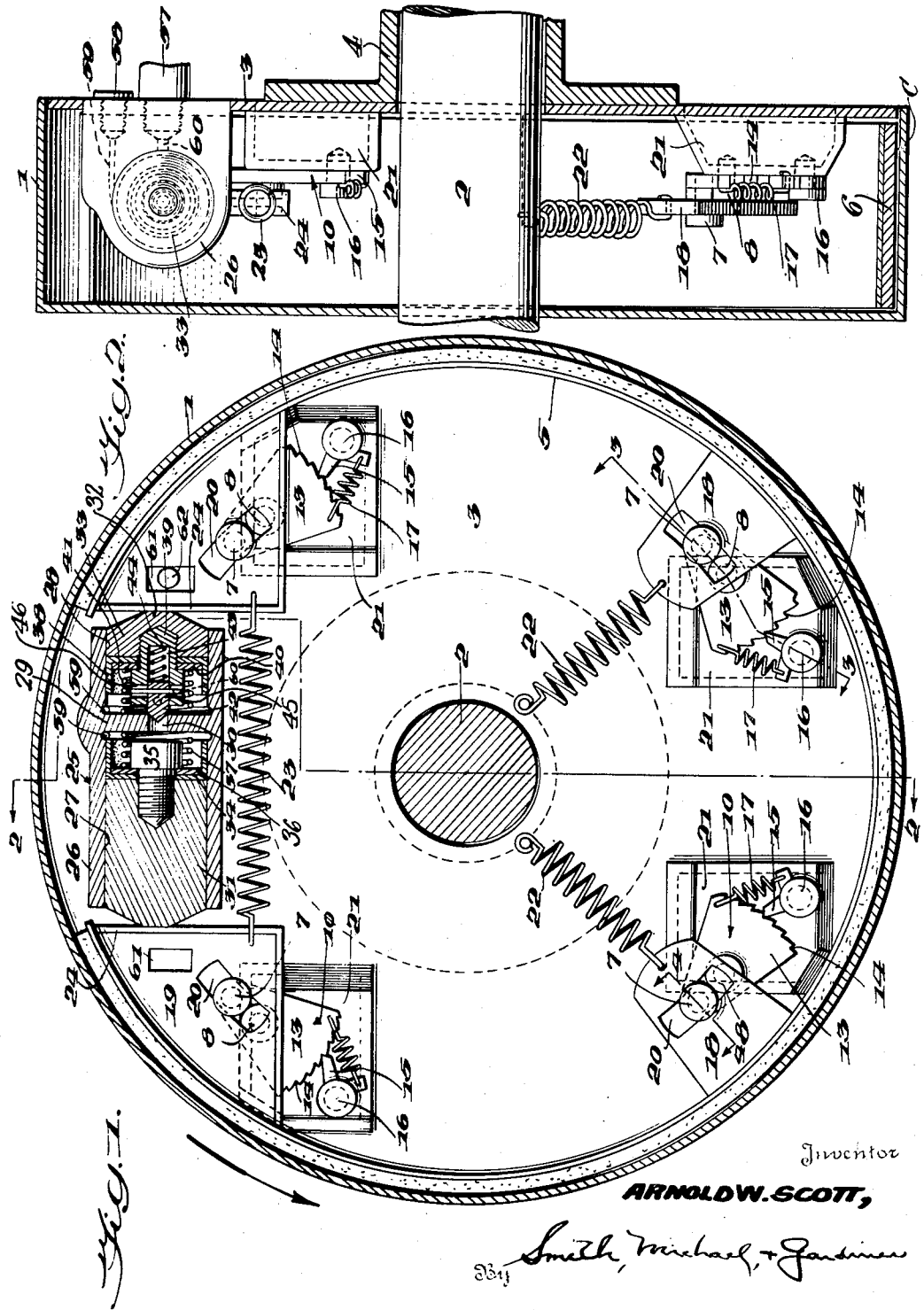
Inventor
ARNOLD W. SCOTT,
By Smith, Michael + Gardiner
Attorney Sept. 10, 1940.　　　A. W. SCOTT　　　2,214,679
BRAKE MECHANISM
Filed April 18, 1939　　　2 Sheets-Sheet 2
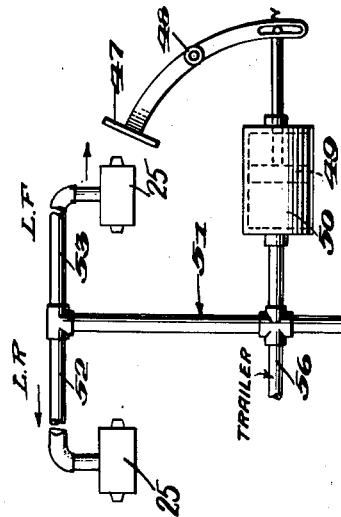
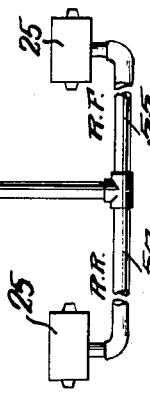
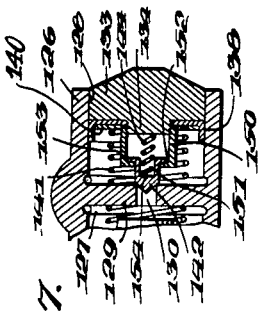
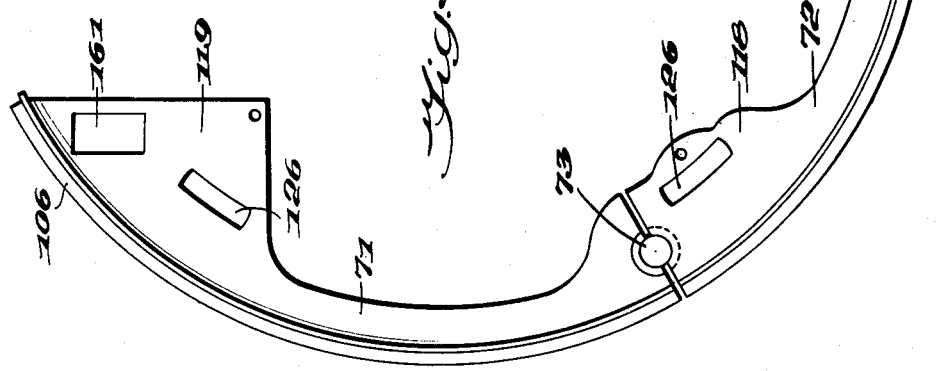
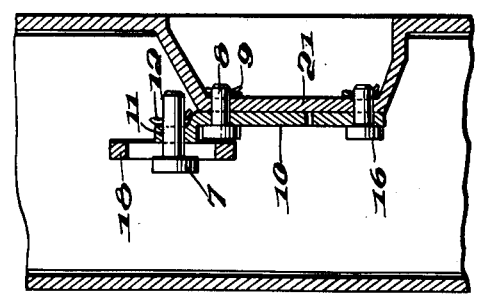
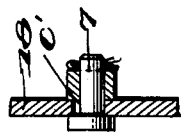
Inventor
ARNOLD W. SCOTT,
By *Smith, Michael & Jardine*
Attorney Patented Sept. 10, 1940

2,214,679

UNITED STATES PATENT OFFICE 2,214,679

BRAKE MECHANISM

Arnold W. Scott, Detroit, Mich.

Application April 18, 1939, Serial No. 268,605

17 Claims. (Cl. 188—152)

This invention is a fluid pressure brake mechanism. The invention is capable of general application although it is designed particularly for use in connection with motor vehicles and the like.

One object of the invention is to provide a fluid pressure brake mechanism which may be self-equalizing, that is, wherein the braking force applied to the several brake mechanisms on the vehicle will be substantially equal at all times, even with considerable variation in condition of friction surfaces in connected assemblies. Thus, one of the principal object of the present invention is to provide a self-equalizing braking mechanism wherein the retarding of the braking force is used to regulate the expansion of the brake band, and the resulting braking force, in constant proportion to the pressure applied to the fluid in the power transmission means interposed between the brake pedal and the several brake mechanisms.

Another object of the present invention is to provide means for automatically maintaining proper clearance between the brake band or shoe and the brake drum.

Another object of the invention is to provide a brake mechanism of the character described wherein a full floating band or an articulated shoe may be employed of appreciably greater than the usual arcuate extent, the present mechanism permitting brake shoes or bands of substantially 300° in arcuate extent to be used.

Another object of the invention is to provide a construction by reason of which the shoe or band may be reversed end for end whereby to increase the life of the braking surface.

Another object is to provide a fluid pressure means for applying braking force to a band or shoe, said mechanism including a plurality of pistons and cylinders, one of the pistons and cylinders having associated therewith automatic valve mechanism for controlling the application of pressure to the other of said cylinders automatically to control expansion of the band and retarding force in response to pressure developed within the fluid pressure system associated with the brake pedal or other means employed for applying braking force to the system.

These and other objects will become apparent from the following specification read in the light of the accompanying drawings wherein a preferred embodiment of the invention is illustrated.

The invention consists in the hereinafter described apparatus and in certain combination of parts but it is to be understood that such changes in size and proportion of parts may be made as fairly fall within the spirit of the invention as set forth more particularly in the appended claims.

In the accompanying drawings wherein a preferred embodiment of the invention is illustrated:

Figure 1 is a vertical sectional view taken through a brake drum showing the apparatus comprising this invention mounted thereon.

Fig. 2 is a sectional view taken on the line 2—2 of Fig. 1.

Fig. 3 is a detailed sectional view taken on the line 3—3 of Fig. 1.

Fig. 4 is a detailed sectional view taken on the line 4—4 of Fig. 1.

Fig. 5 is a fragmental elevation of an articulated brake shoe.

Fig. 6 is a diagrammatic view showing conventional means of applying fluid pressure to the braking system.

Fig. 7 is a fragmentary detailed view, partly in section, of a modified form of control valve and piston assembly.

Referring more particularly to the accompanying drawings wherein like reference numerals are used to designate like parts throughout, the numeral 1 designates the brake drum which may be attached to a vehicle wheel or other rotating element carried by a shaft or axle member 2. The drum 1 is substantially cup-shaped, as shown, and co-operating therewith is the usual backing plate 3 carried by the shaft or axle housing 4.

The braking mechanism is mounted within the enclosure formed by the drum 1 and the backing plate 3 and comprises, in the form of the invention shown in Fig. 1, a flexible brake band 5 generally arcuate in configuration and carrying on its outer face and in opposition to the inner face of the brake drum 1, a suitable friction material or lining 6. The brake band 5 with its attached lining is floatingly supported within the brake housing upon movable pins or anchor members 7. In the present instance I have shown four such movable supporting pins 7 but any conventional number, more or less, may be used as desired and found expedient.

The pin members 7 as shown more particularly in Fig. 3 of the drawings, are mounted for movement about pivot pins 8, which latter are carried directly by the backing plate 3 and extend through suitably provided apertures therein. The pins 8 may be secured within or upon the backing plate 3 in any conventional manner, such as by cotter pins 9. The pin members 7 are constrained to move about the pivot pins 8 by reason of suitable lever members 10 pivotally mounted upon the pins 8, each of said plates being provided at one end with an aperture 11. The pins 7 are entered in the respective apertures 11 and secured therein against withdrawal by any suitable means such as cotter pins 12. This construction is more clearly shown in Fig. 3.

The opposite ends of the levers 10 are substantially wing-shaped as at 13 and the terminal edges of the wing portion of the levers are each provided with indentures or serrations 14. The serrations 14 are formed as ratchet teeth and each such toothed portion of the respective levers 10 has associated therewith a pawl member 15. The several pawls are mounted upon pivot pins 16 threaded through and secured in the backing plate 3. Each of the pawl members 15 is provided with an arm to which is attached a suitable biasing means such as a spring 17, the opposite end of which may be connected to the respective lever members 10 in a manner to urge the pawl into operative engagement with the ratchet face or edge of the lever. From a consideration of the construction thus far described it is apparent that the several lever members 10 may turn in a direction to bring the respective pin members 7 closer to the periphery of the brake drum 1 but are constrained against movement in the opposite direction or away from the drum.

The brake band 5 may be conveniently provided with suitable bracket members or lugs 18 and 19 for supporting the band from or upon the pin members 7. The bracket members or lugs 18 and 19 are each provided with arcuate slots 20 through which pass the pin members 7. By reference to Fig. 3 it will be noted that the levers 10 have that portion through which the respective pin members 7 pass, upset above the plane of the body portion of the levers in order to provide clearance between the lug members 18 and 19 and the heads of the pin members 8. Also, the backing plate 3 may be conveniently provided with bosses or protuberances 21 in order to bring the supporting portion of the backing plate in the region of the lug members 18 and 19 close to the plane of said members, having in mind that the lugs or bracket members 18 and 19 are substantially centrally disposed with respect to the transverse dimension of the brake band 5.

The shoe or band member 5 is biased inwardly in order to maintain the friction lining 6 normally out of engagement with the braking surface of the drum 1. For this purpose I have provided a plurality of spring members 22 and 23, the spring members 22 being anchored at one end on the backing plate and at the opposite end to the lugs 18, whereas the spring 23 has its opposite ends connected to the bracket or lug members 19, respectively. The slot members 20 provided in the lug members 18 and 19 are dimensioned with respect to the diameter of the pin members 7 which pass therethrough, to provide a fixed and predetermined clearance between the friction surface 6 and the inner or braking surface of the drum 1. This clearance is clearly shown at c in Fig. 2 and the pin and slot clearance at c' in Fig. 4.

The bracket members 19 are each provided with an abutment surface 24 for operatively receiving the ends of a pair of force applying instrumentalities by reason of which spreading force is applied to the bracket members 19 for the purpose of expanding the band member 5 into braking engagement with the drum 1. These surfaces 24 may take any convenient form but are shown as web members struck up or otherwise provided on the bracket members 19. The means for applying spreading force between the bracket members 19 comprises a piston and cylinder unit generally indicated by the reference character 25.

The unit 25 comprises a housing member 26 which may be conveniently supported from the backing plate 3 in any convenient manner. The housing member 26 is provided with a pair of cylinders 27 and 28, said cylinders opening out through opposite ends of the housing member 26 and being separated intermediate the ends of the housing by a partition member 29, said partition member being provided with an aperture or duct 30 providing communication between the respective cylinders 27 and 28. Mounted within the cylinder 27 is a piston member 31 having at one end a force applying surface 32 in engagement with the surface 24 of one of the bracket members 19. The cylinder 28 is similarly provided with a piston 33, one end of which extends beyond the opposite end of the housing member 26 and into engagement with the surface 24 of the other bracket member 19. The piston member 31 is provided with a cup packing 34 or similar means to provide a fluid-tight joint between the piston 31 and its cylinder 27, and said packing is maintained in position upon the cylinder end by means of a bolt member 35 threaded into a bore in the end of the piston and operating to clamp a washer 36 against that portion of the cup packing interposed between the washer and the end of the piston. An expansion spring member 37 is provided within the cylinder and engaged between the washer 36 and one face of the partition member 29 and tends to urge the piston 31 into engagement with its cooperating band lug 19.

The piston 33 is similarly provided with a cup packing 38 secured to the end of the piston by means of a screw 39 and clamping washer 40 in a manner similar to the packing described in connection with piston 31. An expansion spring 41 is positioned between the partition 29 and the opposed end of the piston 33 to bias the piston outwardly into engagement with the associated face 24 of the lug 19.

The duct 30 affording communication between the cylinders 27 and 28 is controlled by a plug valve 42 mounted within a bore 43 in the screw 39 of the piston 33. The valve 42 seats in the end of the duct 30 leading into the cylinder 28 and is biased into engagement with its seat by means of an expansion spring 44 housed within the bore 43 and bearing at one end upon the bottom of the bore 43 and at its opposite end upon the inner end of the valve member 42. To limit the movement of the valve member 42 within its bore, said valve is provided with a pin or lug 45 which extends laterally from the valve 42 into operative engagement with a slot or bore 46 provided in the head of the screw 39. With the construction just described in connection with the piston 33 and its associated valve member 42, it will be noted that the normal position of the valve 42 is in engagement with its seat.

The respective cylinders 27 and 28 are in communication with any conventional form of fluid pressure system such as indicated diagrammatically in Fig. 6. The system here illustrated shows a foot pedal 47 which represents any convenient or approved form of applying force to the hydraulic system with which it is connected. As shown, the pedal 47 is pivoted at 48 so that when moved in the direction indicated by the arrow in Fig. 6 the piston member 49 is moved in its associated cylinder 50 to apply pressure to a transmission fluid which fills the system indicated by the piping or conduits 51. The pipe system 51 includes a branch 52 designed for connection to and communication with the brake mechanism of the left rear wheel of the vehicle, a branch 53 for connection to the left front wheel brake mechanism, a branch 54 for connection to the right rear brake mechanism and a branch 55 for connection to the right front brake mechanism. If desired an auxiliary connection 56 may be provided for connection to the brake mechanism of a trailer. This phase of the braking system will be referred to more particularly hereinafter.

One of my improved pressure applying units, as described, is operatively associated with each wheel brake of the vehicle (as shown in Fig. 6), and thus, in the construction shown in Fig. 1 the pressure applying unit 25 is connected to either the conduit 52 or 53 (of Fig. 6) depending upon whether said mechanism is associated with the left rear or the left front wheel, by any suitable connection such as indicated at 57 in Fig. 2.

Initially the entire system as shown in Fig. 6 and the pressure applying units 25 of each brake mechanism are filled with a suitable fluid such as oil, and to insure the cylinders 27 and 28 being filled, suitable vent plugs such as 58 are provided. The plugs 58 communicate through ducts 59 with the upper ends of each of the cylinders 27 and 28. The connection 57 communicates with a duct 60 leading into the cylinder 28.

The bracket members 19 are each provided with an angular slot or aperture 61. The slot 61 accommodates a reverse anchor pin 62 as shown in Fig. 1. The slot 61 and the pin 62 are dimensioned to provide a predetermined clearance slightly greater than the clearance provided between the cross pin 45 and the walls of the slot 46, the purpose of which will be hereinafter explained.

In operation the parts of my improved brake mechanism normally occupy the positions shown in Fig. 1 when no pressure is applied in the hydraulic transmission system associated with said mechanism. It is to be assumed that the hydraulic transmission system and the cylinders 27 and 28 are filled with fluid. Under these conditions the brake band 5 is constructed to maintain predetermined clearance between the friction surface 6 of the band and the braking surface of the drum 1, which clearance is determined by the relative dimension of the slots 20 of the band lugs 18 and 19 and the pin members 7 passing through said slots, as clearly shown in Fig. 4. Thus, under the influence of the springs 22 and 23 the walls of the slots 20 nearest the periphery of the band are in engagement with the opposed side of the respective pins 7 and the wall of the slot 61 farthest from the surface 24 of the right hand bracket 19 is in engagement with the opposed surface of the anchor pin 62. With the parts in this position, an initial application of pressure upon the foot pedal 47 creates pressure in the fluid pressure system 51 which is communicated to the cylinder 28 by means of the connection 57 above referred to. The initial application of pressure to the cylinder 28 causes the piston 33 to move to the right as viewed in Fig. 1 until the cross pin 45 engages the left hand wall of the slot 46. Further movement of the piston 33 to the right unseats the valve 42 and admits fluid pressure to the cylinder 27. This initial movement of the piston 33 is accommodated by the clearance shown between the left hand side of pin 62 and the opposed side of the slot 61 as shown in Fig. 1. Continued application of pressure upon the foot pedal causes the piston 31 to move to the left thereby crowding the left hand end of the band 5 outwardly into frictional engagement with the inner braking surface of the drum 1. This movement of the piston 31 continues until the frictional engagement between the lining 6 and the band 1 is sufficient to cause the brake band assembly to move or rotate slightly in response to continued rotation of the drum 1. This movement of the band acting through the right hand bracket or lug 19 and the piston 33 moves the piston 33 to the left sufficiently to permit the valve 42 to close under the influence of the spring 44. This closing movement of the valve results directly from the withdrawal of the abutment offered by the wall of the slot 46 to the cross pin 45. Upon closure of the valve 42 at this stage of the application of the brake, pressure corresponding to that existing in the cylinder 28 is permitted to build up in all of the other pressure applying units 25 connected to the system shown in Fig. 6. The closure of valve 42 cuts off the admission of further fluid pressure to the cylinder 27 and the piston 31 thereof subsequently functions as anchoring means for the band as expanded due to outward movement of the piston 33. This assures automatic equalization of braking force on all of the brake mechanism connected with the system. In instances where the system shown in Fig. 6 is connected through conduit 56 to a set of similar brake mechanisms on a trailer vehicle it is apparent that the equalization of pressure in the several braking mechanisms will comprehend the brake mechanisms of the trailer vehicle also.

Upon equalization of pressure in the several brake mechanisms such as associated with the four wheels of a motor vehicle and the trailer if attached and connected to the system, continued application of pressure upon the pedal 47 causes an increase in pressure in the respective cylinders 28 which again causes movement of the piston 33 to the right to open the valve 42 and admit further pressure fluid to the cylinder 27 causing a further or additional expansion of the pressure applying unit 25 with resulting increase in the braking force applied to the drum 1.

From the foregoing it will be understood that the piston 31 which has been described as functioning as anchor means for the brake band, forms an abutment against which the band may be crowded by outward movement of the actuating piston 33, but this anchoring function of the piston 31 has no reference to or significance in respect to the transmission of braking torque which, of course, is transmitted to the piston 33. Furthermore, the end of the band 5 which is in engagement with the piston 33 is what is generally termed the trailing end of the band, inasmuch as it is held stationary by the piston 33 during moments when braking torque is being transmitted from the band to the piston. Similarly, the end of the band in engagement with the piston 31 is generally referred to as the leading end of the band.

It has previously been stated that the brake mechanism of my invention is self-adjusting or compensating in order that a predetermined and definite amount of clearance may be maintained between the brake drum and the frictional surface of the band. This is accomplished by mounting the band upon the floating pins 7. From the previous description and the manner in which the band 5 is mounted upon the pin 7, it is apparent that upon excessive wear of the frictional lining member 6 such as to present a greater clearance between the surface of the member 6 and the inner braking surface of the drum 1 than is provided by way of clearance between the pins 7 and the associated slots 26 (shown in Fig. 4), the pins 7 will move outwardly under the influence of a braking application of pressure, this movement of the pins causing slight rotation of the several levers 10 and causing the locking pawls 15 to retain the plates 10 in their new position of adjustment. It will be understood, of course, that the clearance provided between the pins 7 and the walls of the slots 26 will, upon release of pressure on the pedal 47, permit the band 5 to be retracted within the limits of the clearance provided, so that there is no drag between the band member 5 and the drum 1 in any position of adjustment of the members 10.

In Fig. 5 I have shown a modified form of braking shoe. In this form the lining 106 is mounted upon an articulated shoe comprising shoe sections 71 and 72 interconnected by a suitable pivot pin 73. The section 71 of the shoe is provided with a bracket 119 similar to the bracket 19 of the band 5. The bracket 119 is provided with slots 161 and 126 corresponding to slots 61 and 26 of the band 5 shown in Fig. 1.

Reference has hereinbefore been made to the reversibility of the brake band or brake shoe included in my improved brake mechanism and this feature may be accomplished by the provision of duplicate slots 61 or 161 and the symmetrical disposition of the lugs 18 and 19 in the construction shown in Fig. 1, or 118 and 119 as shown in the shoe of Fig. 5.

In Fig. 7 I have shown a modified form of piston and valve assembly. In this form the piston 133 is provided with a threaded boss 134 on which is mounted the cup packing 138. The packing is secured in place by a washer 140 which in turn is maintained in snug contact with the packing by means of an internally threaded nipple 150. The nipple at its outer end is provided with a centrally disposed aperture 151 of appreciably smaller diameter than the internal diameter of the nipple whereby to provide an inner annular shoulder 152. Mounted within the cavity or chamber defined between the outer end of the nipple 150 and the threaded boss 134 is a valve member 142. The vale member 142 snugly fits the aperture 151 and, at its inner end is provided with an outwardly extending annular flange or shoulder 153. The valve member 142 is projected beyond the end wall of the nipple 150 by means of a spring member 144 mounted within the cavity or chamber of the nipple and engaging at its opposite ends the end of the threaded boss 134 and the inner end of the valve member 142. The valve member 142 may be provided with a centrally disposed recess 154 to partially house and position the spring 144, if desired. The piston and control valve assembly just described is mounted within the housing member 126 and is urged outwardly of the cylinder 128 thereof by the expansion spring 141 having its opposite end in engagement with the washer 140 and the opposed wall of the partition 129. The valve 142 is arranged to seat in and control fluid through the duct 130, which duct furnishes a means of fluid communication between the cylinder 128 and the cylinder 127, in the same manner as the piston and control valve assembly shown and described in that form of the invention illustrated in Fig. 1.

From the foregoing description read in the light of the accompanying drawings it is apparent that I have provided brake mechanism which is self-adjusting and compensating to automatically maintain a given predetermined clearance between the frictional surface and the braking surface of the drum, as well as to automatically equalize braking or retarding force of the several brake mechanisms connected to the pressure system by which they are operated. Furthermore, by the provision of duplicate anchor pin receiving apertures and the symmetrical disposition of the supporting lugs carried by the shoe or band, the shoes or bands may be reversed end for end in order to prolong the life of the lining.

One important advantage of the foregoing construction is that the clearance between the brake band and the drum may be predetermined in the factory by properly dimensioning the pins 7 and the slots 20 and this clearance adjustment cannot be thereafter disturbed by mechanics. It should be noted that the arcuate formation of the slots 20 permits the slight rotational movement of the band necessary to actuate the valve 42. In this connection, however, it is to be noted that the clearance provided between the pin 62 and the side walls of the slot 61 defines the range of movement rotationally of the band and that this clearance in turn is correlated to the clearance provided between the pin 45 and the slots 46, the walls of which slots define the limiting abutments for the pin and determine the range of movement of the valve 42 with respect to the piston 33.

It will be understood, of course, that while I have shown and described a fluid pressure operated brake mechanism wherein the expansion of the brake band and the resulting braking force is in constant proportion to the pressure applied by means of the fluid pressure transmission means, the actual ratio of braking force to applied fluid pressure can be controlled and varied in different brake mechanisms, in accordance with the service to be demanded of the brake mechanisms, by properly designing the size and proportion of either or both of the cylinders of the band expanding units, or by using levers or other force modifying means between the pistons and the ends of the band which receive the expanding forces without altering the basic principle of operation underlying my invention. Thus, the present invention is applicable with minor changes to either light passenger vehicles or heavy freight or trucking vehicles.

It will be understood that although I have chosen to show the self-adjusting or wear-compensating feature of my invention in connection with a fluid-pressure operated brake, it is apparent that the wear-compensating feature of my invention is of general utility and may be used in connection with mechanically operated brakes as well as fluid pressure operated brakes. It is, of course, of particular advantage in connection with a self-equalizing fluid pressure brake system inasmuch as it definitely assures a uniform movement of the brake pedal in applying braking force to the system, regardless of the degree of wear of the lining members attached to the shoes or bands of the several brake mechanisms.

Having thus described my invention, what I claim as new and desire to secure by Letters Patent is:

1. In combination a fluid pressure brake mechanism including a rotatable brake drum, a brake band mounted for movement into and out of braking engagement with the drum, a fluid pressure actuated device for applying braking force to the band, a source of fluid under pressure; said fluid pressure actuated force applying device being provided with at least two fluid pressure chambers, means for connecting said chambers for the flow of fluid from said source through said chambers in series, a force applying member in each chamber movable in response to pressure of fluid within the respective chambers to apply a braking force to the band, and valve means positioned in the line of fluid flow between said chambers to control the distribution of fluid from one of said chambers to another.

2. In combination a fluid pressure brake mechanism including a rotatable brake drum, a brake band mounted for movement into and out of braking engagement with the drum, a fluid pressure actuated device for applying braking force to the band, a source of fluid under pressure and means for operatively connecting said source of fluid under pressure with said force applying device; said fluid pressure actuated force applying device being provided with at least two fluid pressure chambers, a force applying member in each chamber movable in response to pressure of fluid within the respective chambers to apply a braking force to the band, and means to control the flow of fluid under pressure to the chambers within the force applying device including means responsive to movement of the force applying member associated with one of said chambers before fluid under pressure is delivered to another of said chambers.

3. In combination a fluid pressure brake mechanism including a rotatable brake drum, a brake band mounted for movement into and out of braking engagement with the drum and limited rotational movement in response to frictional drag of the brake drum, a fluid pressure actuated device for applying braking force to the band, a source of fluid under pressure; said fluid pressure actuated force applying device being provided with at least two fluid pressure chambers, means for connecting said chambers for the flow of fluid from said source through said chamber in series, a force applying member in each chamber movable in response to pressure of fluid within the respective chambers to apply a braking force to the band, and means to control the flow of fluid pressure to the chambers within the force applying device including valve means positioned in the line of fluid flow between said chambers responsive in part at least to rotational movement of the brake band due to drag from the drum.

4. In combination a fluid pressure brake mechanism including a rotatable brake drum, a brake band mounted for movement into and out of braking engagement with the drum, a fluid pressure actuated device for applying braking force to the band, a source of fluid under pressure and means for operatively connecting said source of fluid under pressure with said force applying device, said fluid pressure actuated force applying device being provided with two cylinders, a piston in each cylinder movable within the respective cylinders under the force of fluid delivered thereto and effective to apply braking force to the brake band, means providing fluid communication between said cylinders, a normally closed valve controlling flow of fluid through said communication and means for opening said valve in response to brake applying movement of one of said pistons.

5. In combination a fluid pressure brake mechanism including a rotatable brake drum, a brake band mounted for movement into and out of braking engagement with the drum and limited rotational movement in response to frictional drag of the brake drum, a fluid pressure actuated device for applying braking force to the band, a source of fluid under pressure and means for operatively connecting said source of fluid under pressure with said force applying device; said fluid pressure actuated force applying device being provided with two cylinders, a piston in each cylinder movable within the respective cylinders under the force of fluid delivered thereto and effective to apply braking force to the brake band, means providing fluid communication between said cylinders, a normally closed valve controlling flow of fluid through said communication and means for opening said valve in response to brake applying movement of one of said pistons, and for subsequently closing the valve in response to limited rotational movement of the brake band in response to drag from the drum.

6. In combination a fluid pressure brake mechanism including a rotatable brake drum, a band mounted for movement into and out of braking engagement with the drum, a fluid pressure actuated device for applying braking force to the band, a source of fluid under pressure and means for operatively connecting said source of fluid under pressure with said force applying device, said fluid pressure force applying device including a housing provided with aligned cylinders opening out of opposite ends of the housing, a piston in each cylinder, the ends of the respective pistons extending beyond the adjacent ends of the housing and into engagement with opposed ends of the band, a ported partition between the inner ends of the cylinders, a normally closed valve disposed within one of said cylinders and controlling flow of fluid through said port, and means responsive to movement of the piston associated with the cylinder within which the valve is mounted for opening the valve to deliver fluid under pressure to said other cylinder, and means for subsequently closing said valve in response to limited rotational movement of the band in response to drag from the drum.

7. In a fluid pressure brake system including a plurality of substantially identical braking mechanisms each including a rotatable drum, a brake band mounted for movement into and out of braking engagement with the drum, a fluid pressure actuated device for applying braking force to the band, a source of fluid under pressure and means for operatively connecting said source of pressure to said force applying device; means for equalizing the application of braking force to the several brake mechanisms including valve means associated with each fluid pressure actuated force applying member for controlling the distribution of fluid pressure therein, and means for actuating said valve in response to limited rotational movement of the brake band of the associated braking mechanism.

8. A fluid pressure actuated force applying member adapted to exert force upon the opposed ends of a brake band comprising a housing provided with aligned cylinders opening out of opposite ends of the housing, a piston movable in each cylinder and having an end protruding beyond the housing for engagement with an opposed end of a brake band, means providing a duct affording communication between said cylinders, a valve at one end of said duct, means for biasing said valve to closed position and means for opening said valve in response to movement of the piston associated with one of said cylinders under the force of fluid admitted to said cylinder to direct said fluid under pressure to a second cylinder.

9. A fluid pressure actuated force applying device adapted for mounting between the opposed ends of a brake band comprising a housing member provided with aligned cylinders opening out of opposite ends of the housing, a piston mounted in each cylinder, each piston having an end portion extending beyond the housing for engagement with an opposed end of a brake band, means providing a duct affording fluid communication between said cylinders, a valve carried by one of said pistons, means for biasing said valve into a position to close one end of said duct, means for providing limited movement of the valve with respect to the piston on which it is mounted, whereby predetermined movement of the valve carrying piston within its cylinder will cause opening and closing movements of the valve to admit fluid to another cylinder and to close the duct against passage of fluid from one cylinder to the other.

10. In a fluid pressure brake mechanism including a rotatable drum, a brake band mounted for movement into and out of braking engagement with the drum and a fluid pressure actuated force applying device positioned between the opposed ends of the band, means associated with said force applying device for controlling the distribution of fluid pressure within said device including a valve movable at least in part in response to limited rotational movement of the band in response to drag from the drum, and means for mounting the band within the drum including slotted lug members, anchor pins engaging said slotted lugs, said slots being generally arcuate in configuration whereby to permit limited rotational movement of the band with respect to said pins.

11. A fluid pressure actuated force applying member adapted to exert brake applying force upon a brake band comprising a housing provided with plural cylinders, a piston movable in each cylinder and having a portion for engagement with a brake band, means providing fluid communication between said cylinders, a valve controlling said communication, means for biasing said valve to closed position and means for opening said valve in response to movement of the piston associated with one of said cylinders under the force of fluid admitted to said cylinder to direct said fluid under pressure to said second cylinder.

12. A fluid pressure actuated force applying device adapted to exert brake applying force upon a brake band comprising a housing provided with plural cylinders, a piston mounted in each cylinder, each piston having a portion for engagement with an opposed portion of a brake band, means providing a duct affording fluid communication between said cylinders, a valve carried by one of said pistons, means for biasing said valve into a position to close said duct, means for providing limited movement of the valve with respect to the piston on which it is mounted; whereby predetermined movement of the valve carrying piston within its cylinder will cause opening and closing movements of the valve to admit fluid to the other cylinder and to close the duct against passage of fluid from one cylinder to the other.

13. In combination a fluid pressure brake mechanism including a rotatable brake drum, a brake member mounted for movement into and out of engagement with the drum, a fluid pressure actuated device for applying braking force to said brake member, a source of fluid under pressure, said fluid pressure actuated force applying device being provided with at least two fluid pressure chambers, a force applying member in each chamber movable in response to pressure of fluid within the respective chambers to expand the brake member into engagement with said chamber, means for connecting the several chambers of the fluid pressure actuated device for series flow communication with each other and with said source of fluid under pressure, valve means for controlling the series connection between two of said chambers, and means to close said valve to thereby anchor one end of the brake member in response to predetermined movement of the force applying member associated with the other end of said brake member when the brake member is moved by drag upon said brake drum.

14. In a fluid pressure brake mechanism including a plurality of substantially identical braking means, and including a rotatable drum, a brake band mounted for movement into and out of braking engagement with the drum, a fluid pressure actuated device for applying braking force to the band, a source of fluid under pressure, and means for operatively connecting said source of fluid to said force applying device, means for equalizing the application of braking force to the several brake mechanisms including a fluid actuated brake band anchoring member and a fluid pressure actuated brake band expanding member associated with each fluid pressure actuated force applying member, and valve means associated with each braking mechanism for controlling the admission of fluid under pressure to said anchoring device, and means for actuating the several valves to close fluid pressure communication between the respective band anchoring devices and said source of fluid pressure in response to predetermined movement of the respective brake band expanding members of the several braking mechanisms.

15. In combination a fluid pressure brake mechanism including a rotatable brake drum, a brake member mounted for movement into and out of braking engagement with the drum, fluid pressure actuated means for applying braking force to the brake member, a source of fluid under pressure, said fluid pressure actuated means including means defining a plurality of fluid pressure chambers, a force applying member in each chamber movable in response to pressure of fluid within the respective chambers to expand the brake member into engagement with said drum, means for operatively connecting said chambers with the source of fluid pressure, means for operatively connecting the force applying members of said chambers to the leading and trailing ends, respectively, of the brake member, and valve means for controlling the flow of fluid pressure to the chamber associated with the leading end of the brake member, and means for actuating said valve in response to movement of the force applying member of the chamber associated with the trailing end of the brake member.

16. In combination a fluid pressure brake mechanism including a rotatable brake drum, a brake member mounted for movement into and out of braking engagement with the drum, fluid pressure actuated means for applying braking force to the brake member, a source of fluid under pressure, said fluid pressure actuated means including means defining plural fluid pressure chambers, a force applying member in each chamber movable in response to pressure of fluid therein to expand the brake member into braking engagement with said drum, means for operatively connecting the chambers with the source of fluid under pressure, and valve means movable with the force applying member associated with the trailing end of the brake member for controlling fluid flow communication between the source of fluid pressure and the chamber associated with the leading end of the brake member.

17. In combination a fluid pressure brake mechanism including a rotatable brake drum, a brake member mounted for movement into and out of braking engagement with the drum, fluid pressure actuated means for applying a braking force to the brake member, said fluid pressure actuated means including means defining a fluid pressure chamber, a force applying member within said chamber and movable in response to fluid pressure within the chamber, means for operatively connecting said force applying member with the trailing end of the brake member, to move the same into braking engagement with the drum, said fluid pressure actuated means including means defining a second fluid pressure chamber, a force applying member therein movable in response to fluid pressure within the chamber, and means for operatively connecting said last-mentioned force applying member to the leading end of the brake member for moving the same into braking engagement with the drum, means for connecting said chambers with said source of fluid pressure, and means for cutting off fluid flow communication between the second-mentioned fluid pressure chamber and said source of fluid pressure in response to predetermined movement of the first-mentioned force applying member whereby to anchor the leading end of the brake member for further expansion of the brake member under the influence of said first-mentioned force applying member.

ARNOLD W. SCOTT.